US011402061B2

(12) United States Patent
Pittman et al.

(10) Patent No.: US 11,402,061 B2
(45) Date of Patent: Aug. 2, 2022

(54) MOUNTING APPARATUS FOR ELECTRONIC DEVICES AND OBJECTS

(71) Applicant: Cell Gell Mounts, LLC, Mechanicsville, VA (US)

(72) Inventors: Michael Clyde Pittman, Glen Allen, VA (US); Jason Michael Truda, Mechanicsville, VA (US)

(73) Assignee: Cell Gell Mounts, LLC, Mechanicsville, VA (US)

( * ) Notice: Subject to any disclaimer, the term of this patent is extended or adjusted under 35 U.S.C. 154(b) by 187 days.

(21) Appl. No.: 16/937,621

(22) Filed: Jul. 24, 2020

(65) Prior Publication Data
US 2021/0025547 A1 Jan. 28, 2021

Related U.S. Application Data

(60) Provisional application No. 62/877,852, filed on Jul. 24, 2019.

(51) Int. Cl.
*E04G 3/00* (2006.01)
*F16M 13/02* (2006.01)
*F16B 11/00* (2006.01)

(52) U.S. Cl.
CPC ......... *F16M 13/022* (2013.01); *F16B 11/006* (2013.01)

(58) Field of Classification Search
CPC .. F16M 13/022; F16B 11/006; H04M 1/0214; H05K 5/00
USPC ... 248/201, 683, 205.3, 274.1, 309.1, 312.1, 248/346.07; 455/575.1; 439/529; 361/679.01, 679.02, 679.58
See application file for complete search history.

(56) References Cited

U.S. PATENT DOCUMENTS

| | | | | |
|---|---|---|---|---|
| 6,644,611 | B1 * | 11/2003 | Tai | F16M 11/041 248/397 |
| 7,708,240 | B2 * | 5/2010 | Homer | G06F 1/1601 248/920 |
| 8,411,420 | B2 * | 4/2013 | Fu | H04R 5/02 361/679.01 |
| 8,531,834 | B2 * | 9/2013 | Rayner | G06F 1/1633 455/575.8 |
| 8,979,060 | B1 * | 3/2015 | Olsson | H04M 1/04 379/455 |

(Continued)

FOREIGN PATENT DOCUMENTS

CN 206237490 U 6/2017

*Primary Examiner* — Todd M Epps
(74) *Attorney, Agent, or Firm* — Ashok Tankha

(57) ABSTRACT

An adjustable mounting apparatus for mounting electronic devices and objects of various sizes on a flat surface comprises a first bracket and a second bracket. Each of the first and second brackets comprise a substantially horizontal plate, a substantially vertical plate, a back plate extending substantially vertically from a second transverse edge of the substantially horizontal plate, and a reusable adhesive layer disposed at a rear portion of the back plate. The substantially horizontal plate of each of the first and second brackets comprise a first retaining abutment extending substantially vertically from a first transverse edge of the substantially horizontal plate. The substantially vertical plate of each of the first and second brackets comprise a second retaining abutment extending substantially laterally from a first transverse edge of the substantially vertical plate.

20 Claims, 20 Drawing Sheets

(56) References Cited

U.S. PATENT DOCUMENTS

| | | |
|---|---|---|
| 9,511,903 B2 | 12/2016 | Hurst et al. |
| 10,294,016 B2 | 5/2019 | Rayner |
| 2005/0255895 A1* | 11/2005 | Lee ................ H02J 7/0044 455/575.1 |
| 2012/0187260 A1 | 7/2012 | Moyer |
| 2012/0312936 A1 | 12/2012 | Huang |
| 2013/0240587 A1 | 9/2013 | Buchhalter |
| 2014/0205851 A1 | 7/2014 | Mahajan |
| 2016/0234955 A1 | 8/2016 | Innovelis |
| 2018/0314295 A1 | 11/2018 | Language |

* cited by examiner

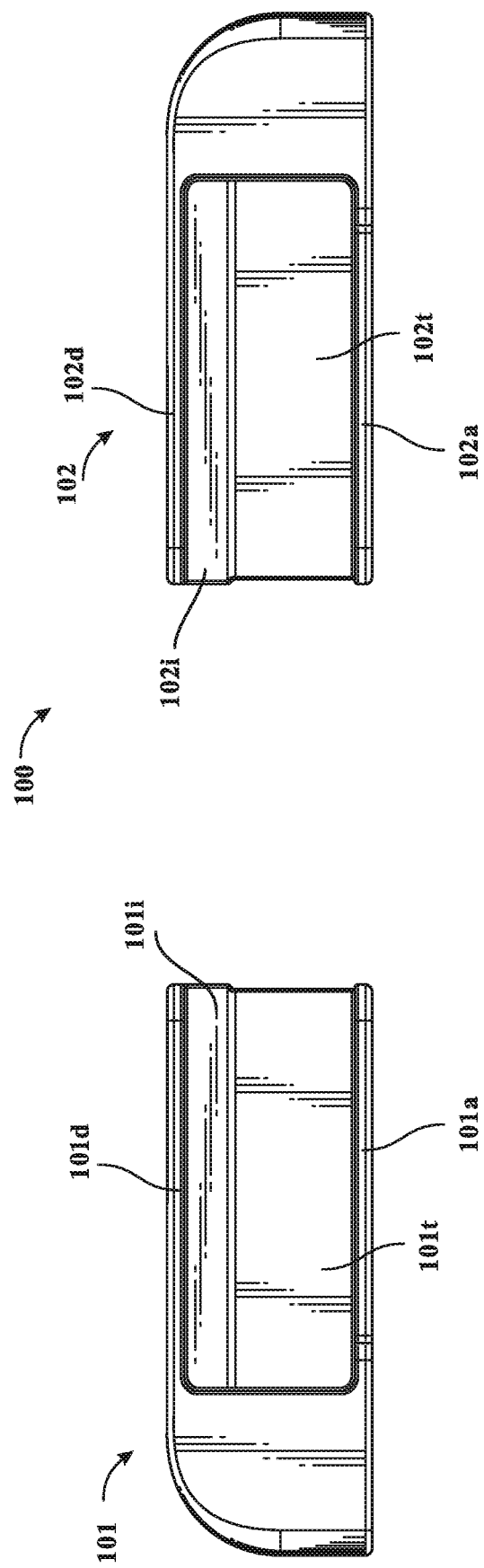

MOUNTING APPARATUS FOR ELECTRONIC DEVICES AND OBJECTS

CROSS-REFERENCE TO RELATED APPLICATIONS

This application claims priority to and the benefit of the provisional patent application titled "Mounting Apparatus For Electronic Devices And Objects", application No. 62/877,852, filed in the United States Patent and Trademark Office on Jul. 24, 2019. The specification of the above referenced patent application is incorporated herein by reference in its entirety.

BACKGROUND

The present disclosure relates generally to an electronic device accessory. More particularly, the present disclosure relates to an adjustable mounting apparatus for holding devices or objects, for example, mobile phones, tablet computers, etc.

Handheld portable electronic devices, for example, digital media players, phones, smartphones, tablet computers, handheld readers, etc., are used for a variety of purposes comprising communication, accessing information and entertainment. These handheld portable electronic devices are frequently used by user, both at home and on the go. However, with the frequency and variety of use of the handheld portable electronic devices, comes the problem of proper protection and placement of the electronic device, especially when the electronic device is not in use, when the user cannot use both his hands to use the electronic device, or when the electronic device is placed in an unsecured position. Without proper protection and placement, a handheld portable electronic device is susceptible to damage due to the device being accidentally dropped from a height from the user's hand, or falling off an unsecured position. Such damage often cause loss of data or information, and often requires replacement of parts of the handheld portable electronic devices.

Protective covers and support frames are available in the market that are designed to prevent or minimize damages to handheld portable electronic devices. The protective covers and support frames encapsulate two or more sides and the back of the handheld portable electronic devices, to protect handheld portable electronic devices from damage during a fall. However, these protective covers and support frames are designed to fit a handheld portable electronic device of a particular size. Since the existing protective covers and support frames are device specific, cut-outs for a charging port, an audio jack, and speaker provided in the protective cover or the support frame of one handheld portable electronic device may not align with the charging port, audio jack, and speaker of another handheld portable electronic device.

Existing protective covers and support frames are designed to be placed on a flat surface, for example, a table, or secured to a user's finger, user's hand, etc., through a strap integrated with the protective cover and the support frame. The protective covers and support frames are not detachably attachable to a surface, for example, a wall, to allow the electronic device to be temporarily mounted on the wall.

Hence, there is a long felt but unresolved need for an adjustable mounting apparatus for detachably mounting handheld portable electronic devices and objects on a substantially flat surface. There is also a long felt but unresolved need for an adjustable mounting apparatus that accommodates handheld portable electronic devices of various sizes and differing configurations. There is also a long felt but unresolved need for an adjustable mounting apparatus that enables a user to utilize the charging port, audio jack, and speakers of any handheld portable electronic device when the device is mounted on the adjustable mounting apparatus.

SUMMARY OF THE INVENTION

This summary is provided to introduce a selection of concepts in a simplified form that are further disclosed in the detailed description of the invention. This summary is not intended to determine the scope of the claimed subject matter.

The adjustable mounting apparatus disclosed herein addresses the above recited need for a mounting apparatus for detachably mounting handheld portable electronic devices and objects to a substantially flat surface. The adjustable mounting apparatus disclosed herein also addresses the above recited need for an adjustable mounting apparatus that accommodates handheld portable electronic devices of various sizes. The adjustable mounting apparatus disclosed herein also enables a user to utilize the charging port, audio jack, and speakers of any handheld portable electronic device mounted on the adjustable mounting apparatus. Examples of handheld portable electronic devices, hereafter devices, comprise smartphones, tablet computers, phones, etc.

The adjustable mounting apparatus comprises a first bracket and a second bracket for holding a device, for example, handheld portable electronic devices, and other objects. Examples of objects other than handheld portable electronic devices comprise photo frames, books, etc. Each of the first and second brackets comprises a substantially horizontal plate, a substantially vertical plate, a back plate extending substantially vertically from a second transverse edge of the substantially horizontal plate, and a reusable adhesive layer located at a rear portion of the back plate. The substantially horizontal plate of each of the first and second brackets comprise a first retaining abutment extending substantially vertically from a first transverse edge of the substantially horizontal plate. The substantially vertical plate of each of the first and second brackets comprise a second retaining abutment extending substantially laterally from a first transverse edge of the substantially vertical plate.

A lower surface of the back plate is inclined with respect to the substantially horizontal plate. The reusable adhesive layer at the rear portion of the back plate is washable. Dirt and debris that stick to the reusable adhesive layer are removed by washing the reusable adhesive layer. Washing the reusable adhesive layer substantially restores the adhesive property of the reusable adhesive layer, thereby allowing the first and second brackets to be mounted, removed, and re-mounted on a substantially flat surface.

BRIEF DESCRIPTION OF DRAWINGS

FIG. 6A exemplarily illustrates a top view of the adjustable mounting apparatus.

DETAILED DESCRIPTION OF THE INVENTION

Figure 1A:
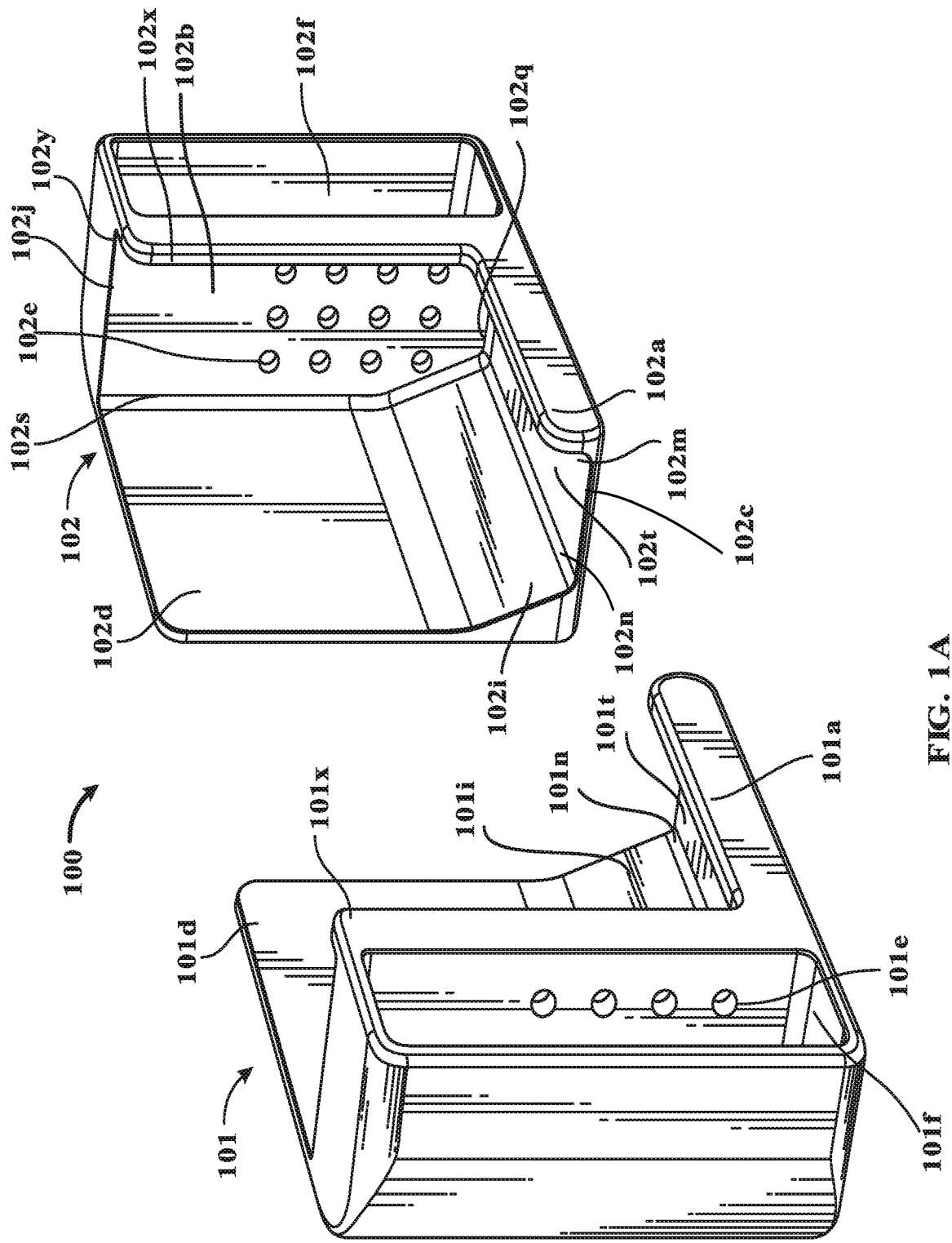
FIGS. 1A-1C exemplarily illustrate front perspective views of an adjustable mounting apparatus.
Figure 1B:
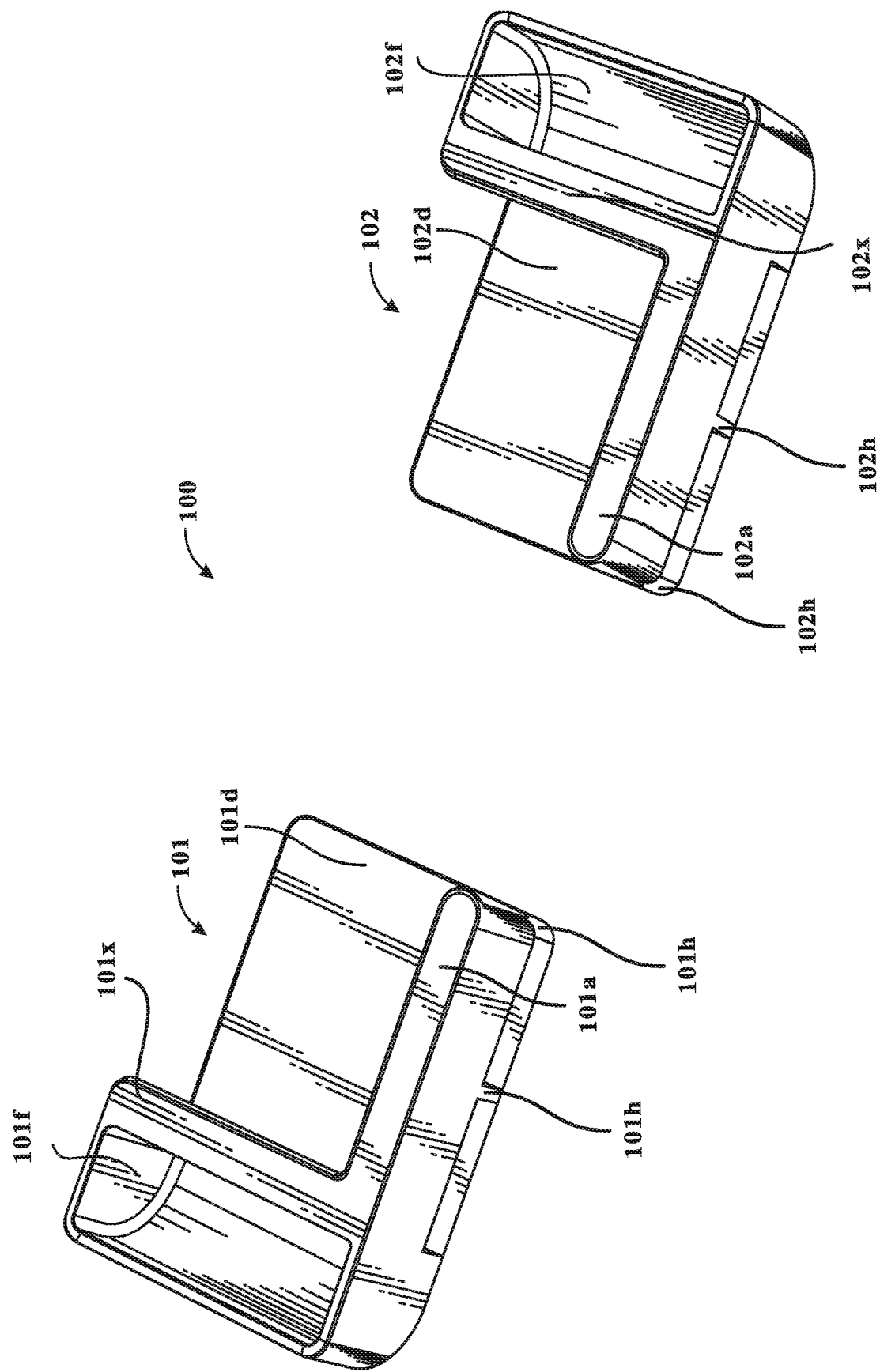
Figure 1C:
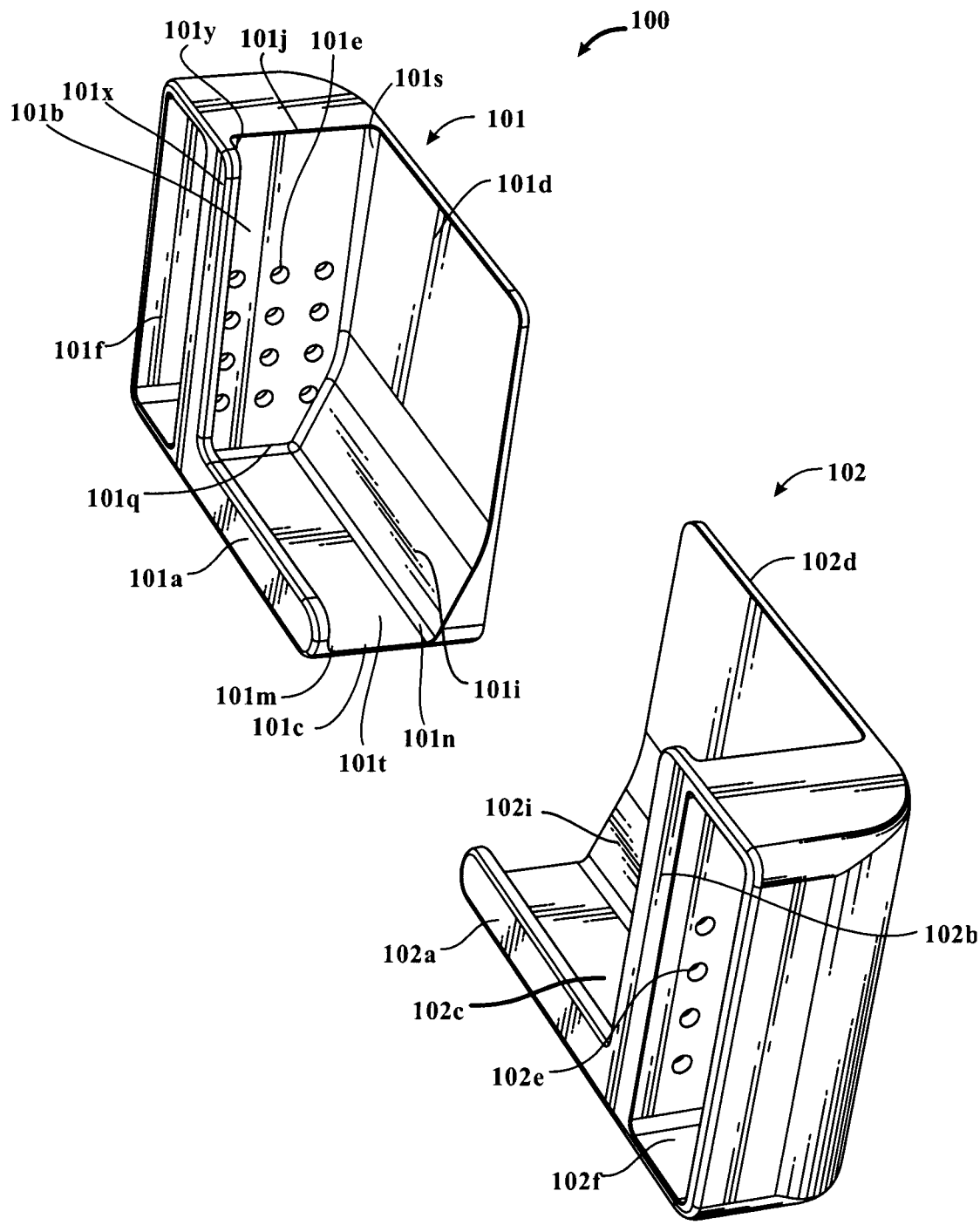
Figure 9A:
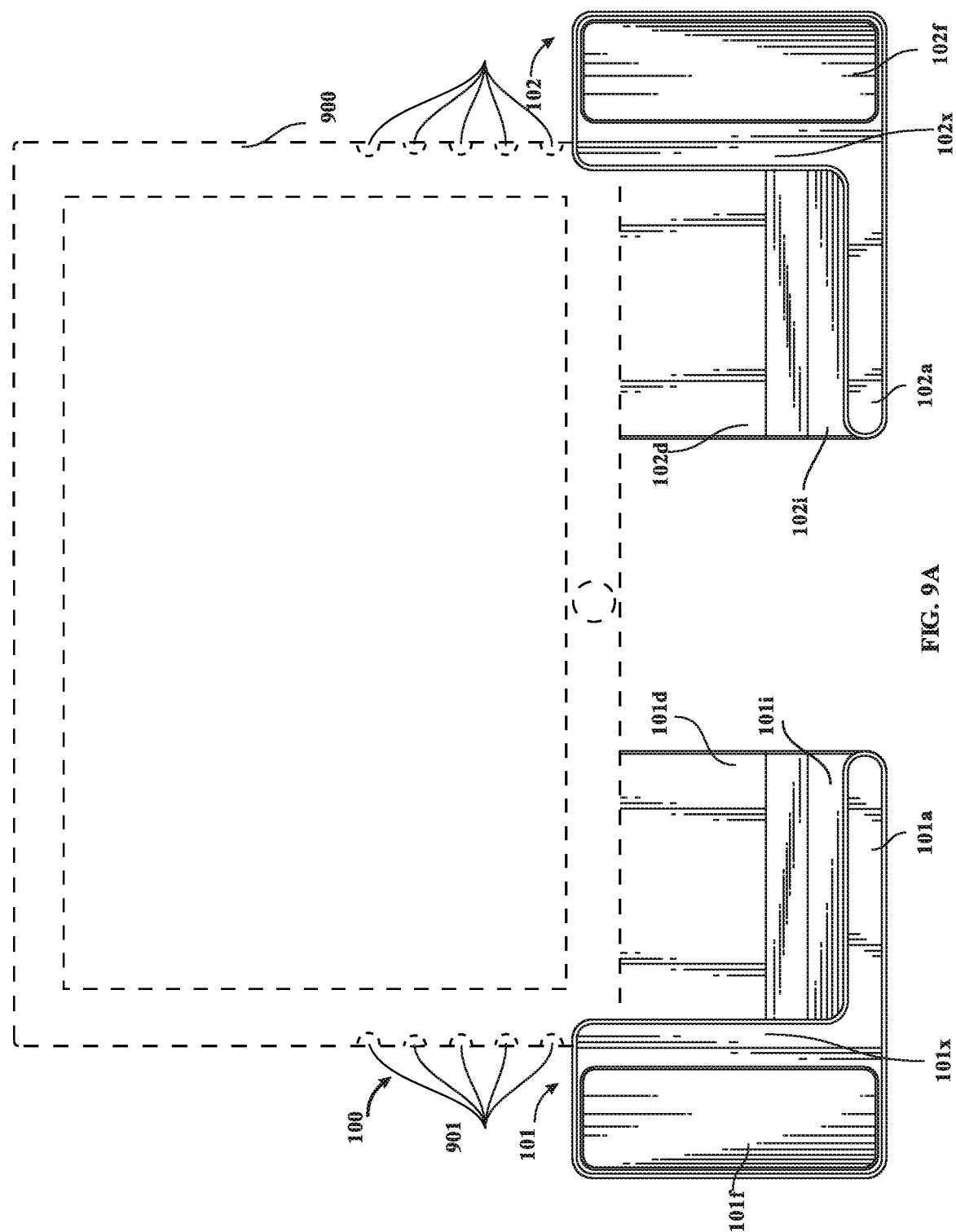
FIG. 9A exemplarily illustrates a front view of the adjustable mounting apparatus illustrated in FIGS. 1A-7 with a portable electronic device slid into the adjustable mounting apparatus.
Figure 9B:
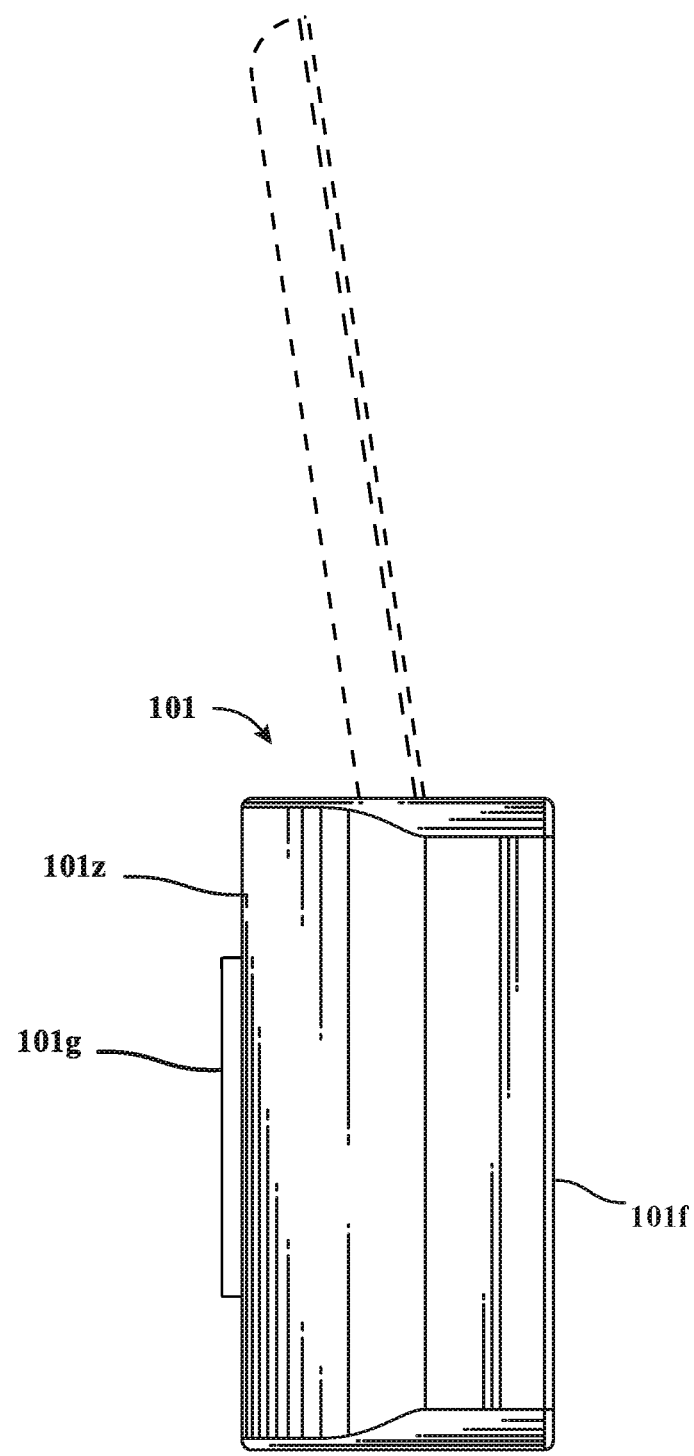
FIG. 9B exemplarily illustrates a left side view of the portable electronic device mounted on the adjustable mounting apparatus illustrated in FIGS. 1A-7.
Figure 9C:
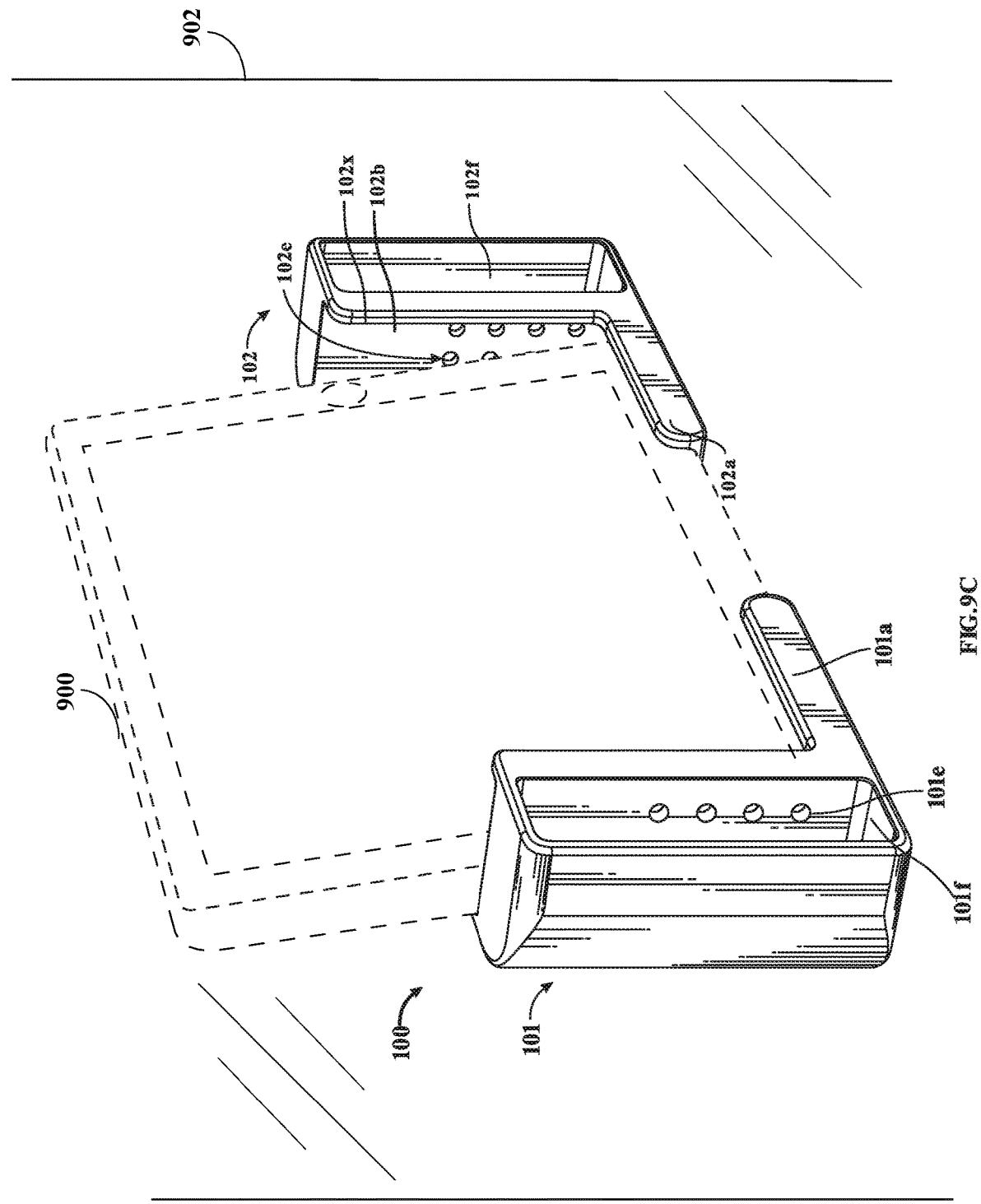
FIG. 9C exemplarily illustrates a front, left side perspective view of the portable electronic device mounted on the adjustable mounting apparatus illustrated in FIGS. 1A-7.

FIGS. 1A-1C exemplarily illustrate front perspective views of an adjustable mounting apparatus 100 mountable on a substantially flat surface 902, as shown in FIG. 9C. The adjustable mounting apparatus 100 comprises a first bracket 101 and a second bracket 102 that are moved by a user towards or away from each other to engage a handheld portable electronic device 900 or other objects disposed there between, as exemplarily illustrated in FIGS. 9A-9C. Examples of handheld portable electronic devices 900, hereafter devices 900, comprise smartphones, tablet computers, phones, etc. Examples of objects comprise photo frames, books, etc.

The second bracket 102 comprises a substantially horizontal plate 102$t$, a first retaining abutment 102$a$ extending substantially vertically from a first transverse edge 102$m$ of the horizontal plate 102$t$, a back plate 102$d$ extending substantially vertically from a second transverse edge 102$n$ of the horizontal plate 102$t$, wherein the lower surface 102$i$ of the back plate 102$d$ is inclined with respect to the substantially horizontal plate 102$t$, a substantially vertical plate 102$b$ extending from a second longitudinal edge 102$q$ of the horizontal plate 102$t$, and a second retaining abutment 102$x$ extending substantially laterally from a first transverse edge 102$y$ of the vertical plate 102$b$, as shown in FIG. 1A. The second retaining abutment 102$x$ is substantially perpendicular to the vertical plate 102$b$.

The horizontal plate 102$t$ is configured to slidably receive a portable electronic device 900 inserted into the second bracket 102 from a first longitudinal edge 102$c$ of the horizontal plate 102$t$ as illustrated in FIG. 9C. The vertical plate 102$b$ extends vertically from the second longitudinal edge 102$q$ of the horizontal plate 102$t$ and terminates at an upper edge 102$j$ of the vertical plate 102$b$, as shown in FIG. 1A.

As illustrated in FIG. 1A, the lower surface 102$i$ of the back plate 102$d$ is inclined with respect to the horizontal plate 102$t$. The back plate 102$d$ is substantially perpendicular to the horizontal plate 102$t$ and the vertical plate 102$b$, as shown in FIGS. 1A and 1B. The back plate 102$d$ extends from the vertical plate 102$b$ along a second transverse edge 102$s$ of the vertical plate 102$b$, as shown in FIG. 1A. In an embodiment, the back plate 102$d$ has a substantially rectangular shape. The back plate 102$d$ comprises a rear portion 102$z$, shown in FIG. 3. In an embodiment, the rear portion 102$z$ of the back plate 102$d$ has a smooth surface finish. In another embodiment, the rear portion 102$z$ of the back plate 102$d$ has a coarse surface finish.

Figure 3:
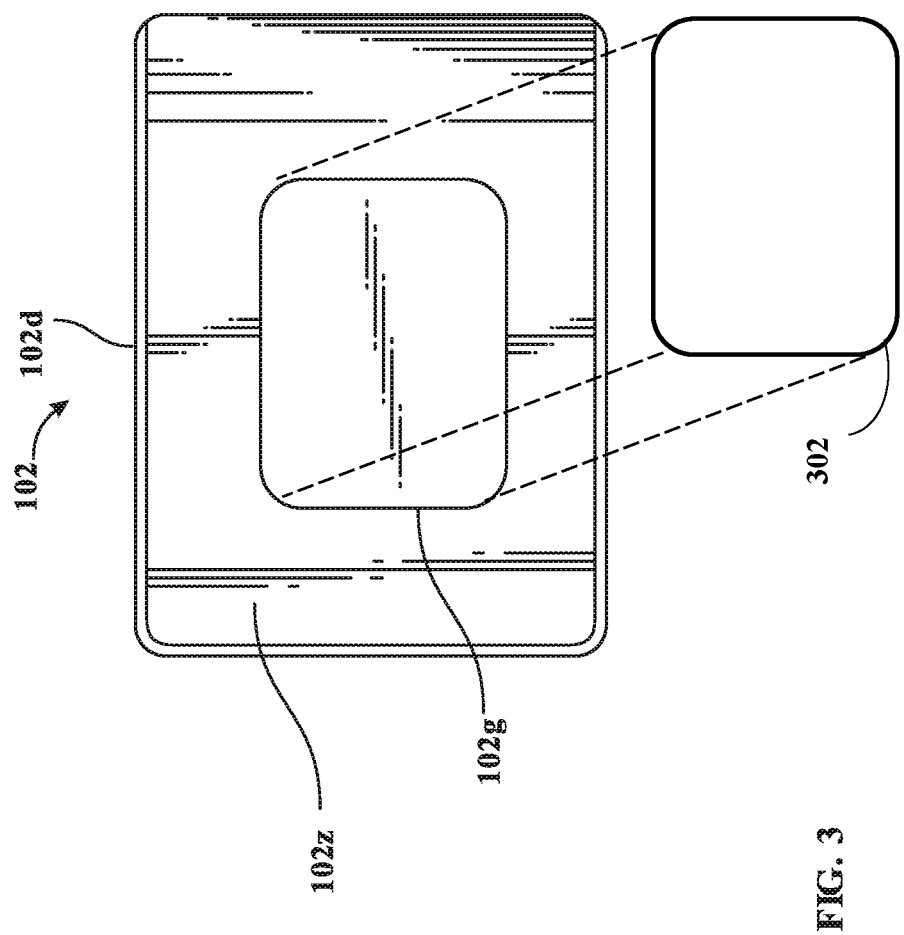
FIG. 3 exemplarily illustrates a rear view of the adjustable mounting apparatus.
Figure 3:
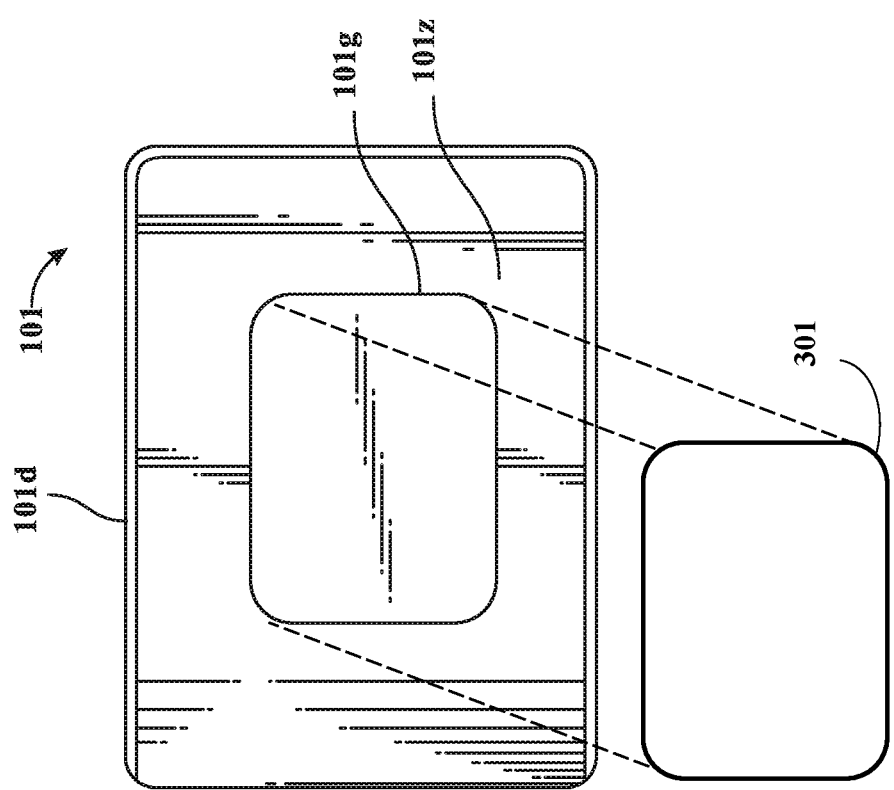

The second bracket 102 further comprises a reusable adhesive layer 102$g$, attached to the rear portion 102$z$ of the back plate 102$d$, as shown in FIG. 3. The reusable adhesive layer 102$g$ allows the second bracket 102 to be mounted, removed, and re-mounted on a substantially flat surface 902, shown in FIG. 9C. In an embodiment, the reusable adhesive layer 102$g$ comprises a nano-suction material. The nano-suction material allows the second bracket 102 to be removably attached to a flat surface 902, for example, a wall, a ceiling, floor, wooden surface, etc. In an embodiment, the nano-suction material allows the second bracket 102 to be removably attached to a non-porous surface, for example, glass, tiles, stainless steel, smooth concrete, etc. In an embodiment, the reusable adhesive layer 102$g$ does not leave a residue on the flat surface 902. In an embodiment, the reusable adhesive layer 102$g$ is washable. Dirt and debris that adhere to the reusable adhesive layer 102$g$ are removed by washing the reusable adhesive layer 102$g$. Washing the reusable adhesive layer 102$g$ substantially restores the adhesive property of the reusable adhesive layer 102$g$ that is lost during use. In an embodiment, the nano-suction material is a WGO® branded adhesive tape bearing part number U-RST-01, manufactured by Ideal Home Universal Tape Co. Ltd., No. 220, Yuehui Road, Guangdong, China.

In an embodiment, the vertical plate 102$b$ comprises holes 102$e$ defined through the vertical plate 102$b$, as shown in FIG. 1A. The holes 102$e$ are proximal to the second longitudinal edge 102$q$ of the horizontal plate 102$t$, as shown in FIG. 1A. The holes 102$e$ are configured to allow sound emitted from a speaker 901 of an electronic device 900 to pass through the vertical plate 102$b$ of the adjustable mounting apparatus 100, as shown in FIGS. 9A and 9C. In an embodiment, the holes 102$e$ are arranged in a matrix, as shown in FIG. 1A. In an embodiment, the matrix comprises 4 rows with each row comprising 3 holes 102$e$. In another embodiment, the hole matrix comprises 4 rows with each row comprising 4 holes 102$e$. In another embodiment, the matrix comprises 4 rows with each row comprising a single hole 102$e$. In an embodiment, each hole 102$e$ has a diameter of about 1 mm to about 5 mm. In another embodiment, the diameter of each hole 102$e$ is greater than 5 mm.

Figure 1D:
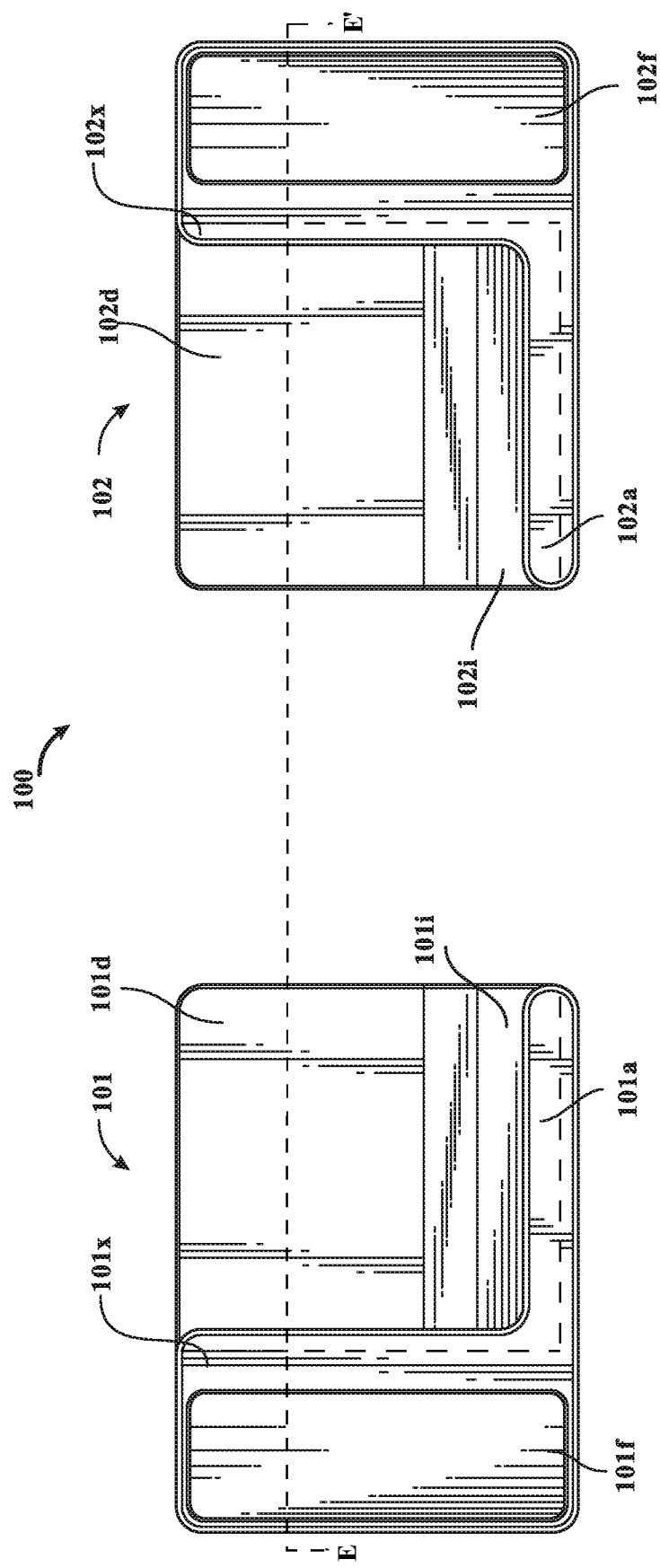
FIG. 1D exemplarily illustrates a front view of the adjustable mounting apparatus.
Figure 1E:
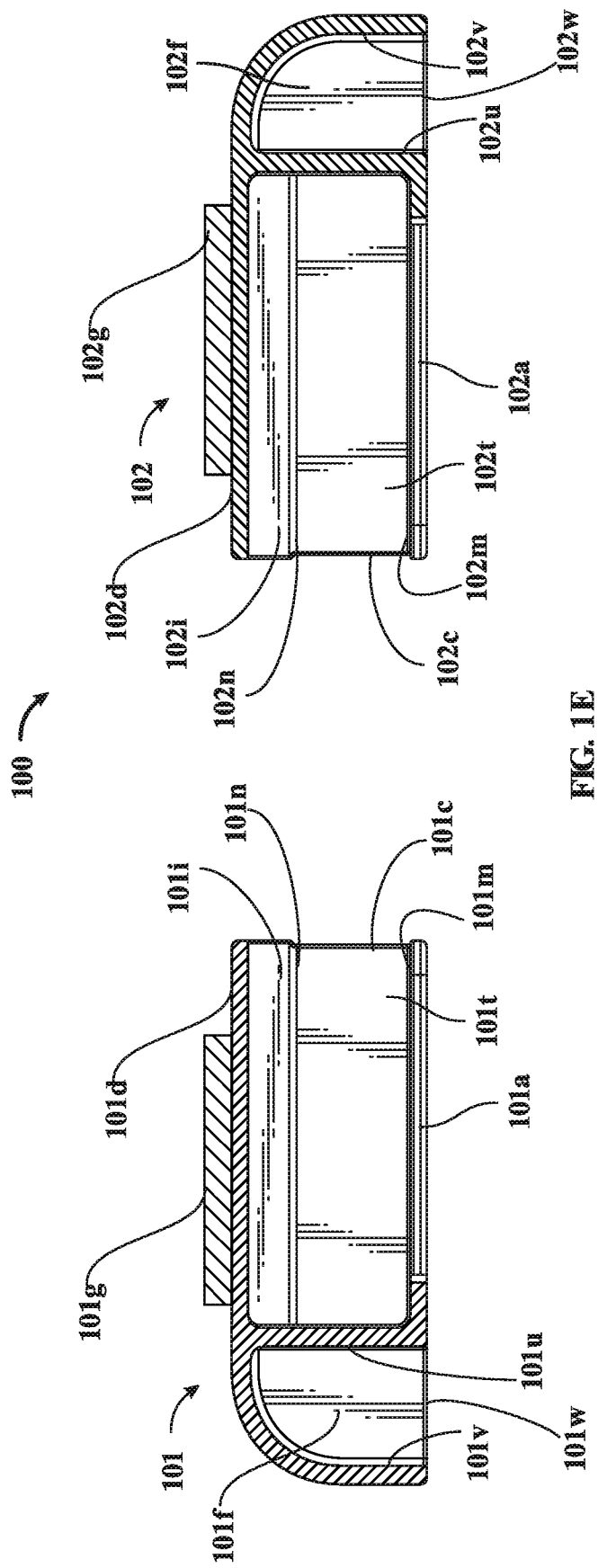
FIG. 1E exemplarily illustrates a top cross-sectional view of the adjustable mounting apparatus where the cross-section is obtained across the line E-E' shown in FIG. 1D.
Figure 1F:
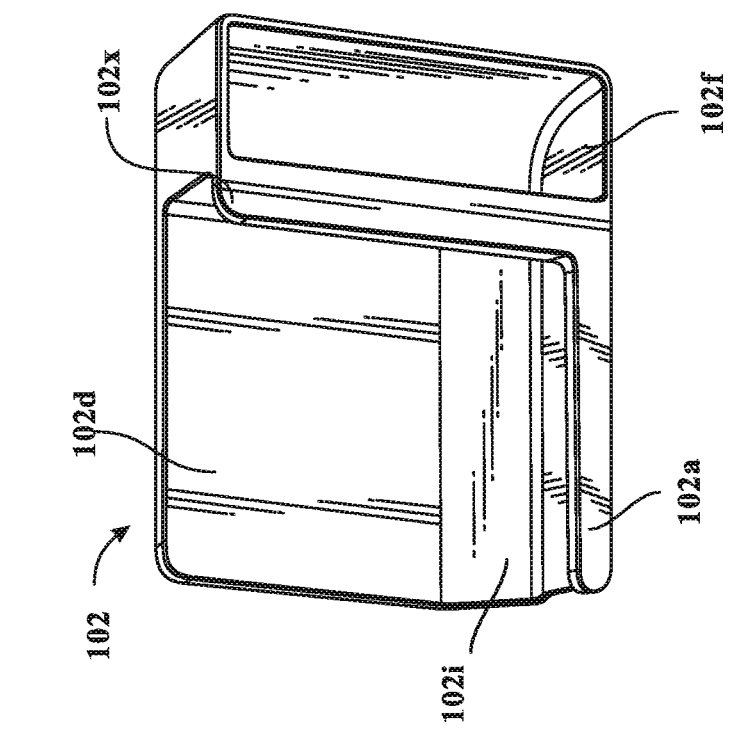
FIG. 1F exemplarily illustrates a front perspective view of the adjustable mounting apparatus.
Figure 1F:
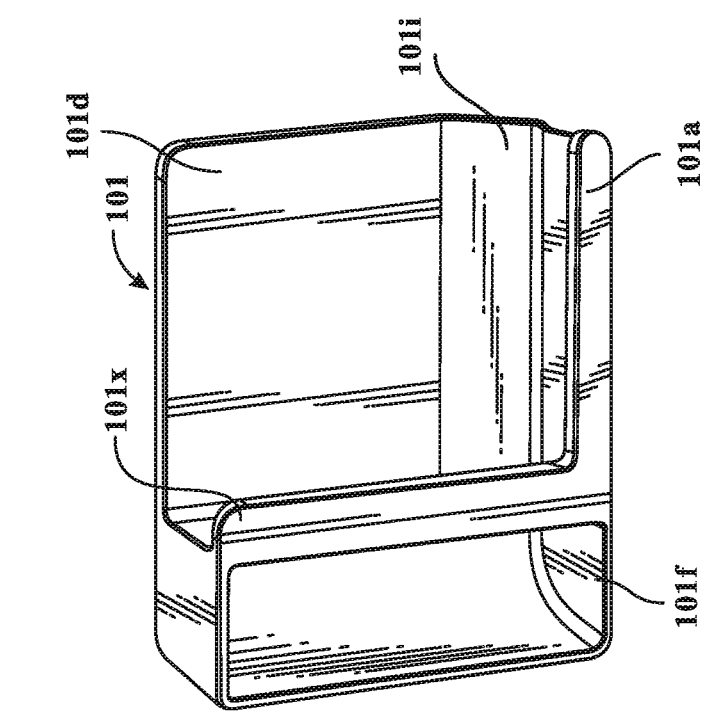

FIG. 1D exemplarily illustrates a front view of the adjustable mounting apparatus 100. In an embodiment, the vertical plate 102$b$, shown in FIG. 1A, of the second bracket 102 comprises a waveguide 102$f$ located behind the vertical plate 102$b$. FIG. 1E exemplarily illustrates a top cross-sectional view of the adjustable mounting apparatus 100 where the cross-section is obtained across the line E-E' shown in FIG. 1D. FIG. 1F exemplarily illustrates a front perspective view of the adjustable mounting apparatus 100. The waveguide 102f has a cross-section that is substantially quadrant shaped, as illustrated in FIG. 1E. The waveguide 102f is in fluid communication with holes 102e in the vertical plate 102b. The holes 102e open into one of the linear sides 102u of the waveguide 102f. The other linear side 102w of the waveguide 102f provides an exit for sound that enters the waveguide 102f through the holes 102e. As illustrated in FIGS. 1A-1D, the waveguide 102f is hollow and extends from the second longitudinal edge 102q to the upper edge 102j of the vertical plate 102b. The waveguide 102f extends along the length of the vertical plate 102b. An electronic device 900, for example, a smartphone, is placed in the adjustable mounting apparatus 100 such that at least one speaker 901 of the electronic device aligns with the holes 102e on the vertical plate 102b. Sound emitting from the speaker 901 passes through the holes 102e and into the waveguide 102f. A curved side 102v of the waveguide 102f reflects the sound towards the other linear side 102w of the waveguide 102f, and the sound exits the waveguide 102f through the other linear side 102w. In an embodiment, the waveguide 102f is generally in the shape of a quarter cylinder which can be inferred from FIGS. 1B and 1E.

The structure of the first bracket 101 mirrors the structure of the second bracket 102, as illustrated in FIGS. 1A-1D. The first bracket 101 comprises a substantially horizontal plate 101t, a first retaining abutment 101a extending substantially vertically from a first transverse edge 101m of the horizontal plate 101t, a back plate 101d extending substantially vertically from a second transverse edge 101n of the horizontal plate 101t, wherein the lower surface 101i of the back plate 101d is inclined with respect to the substantially horizontal plate 101t, a substantially vertical plate 101b extending from a second longitudinal edge 101q of the horizontal plate 101t, and a second retaining abutment 101x extending substantially laterally from a first transverse edge 101y of the vertical plate 101b, as shown in FIG. 1C. As shown in FIG. 1C, the second retaining abutment 101x is substantially perpendicular to the vertical plate 101b. The horizontal plate 101t is configured to slidably receive a portable electronic device 900 in the first bracket 101 from a first longitudinal edge 101c of the horizontal plate 101t, illustrated in FIG. 9C. The vertical plate 101b extends vertically from the second longitudinal edge 101q of the horizontal plate 101t and terminates at an upper edge 101j of the vertical plate 101b, as shown in FIG. 1C.

As shown in FIG. 1C, the lower surface 101i of the back plate 101d is inclined with respect to the horizontal plate 101t. The back plate 101d is substantially perpendicular to the horizontal plate 101t and the vertical plate 101b, as shown in FIGS. 1B and 1C. The back plate 101d extends from the vertical plate 101b along a second transverse edge 101s of the vertical plate 101b, as shown in FIG. 1C. In an embodiment, the back plate 101d has a substantially rectangular shape. The back plate 101d comprises a rear portion 101z, as shown in FIG. 3. In an embodiment, the rear portion 101z of the back plate 101d has a smooth surface finish. In another embodiment, the rear portion 101z of the back plate 101d has a coarse surface finish.

The first bracket 101 further comprises a reusable adhesive layer 101g, attached to the rear portion 101z of the back plate 101d, as shown in FIG. 3. The reusable adhesive layer 101g allows the first bracket 101 to be mounted, removed, and re-mounted on a substantially flat surface 902, shown in FIG. 9C. In an embodiment, the reusable adhesive layer 101g comprises a nano-suction material.

In an embodiment, the vertical plate 101b defines holes 101e through the vertical plate 101b, as shown in FIG. 1C. The holes 101e are proximal to the second longitudinal edge 101q of the horizontal plate 101t, as shown in FIG. 1C. The holes 101e are configured to allow sound emitted from a speaker 901 of an electronic device 900 to pass through the vertical plate 101b of the adjustable mounting apparatus 100, as shown in FIGS. 9A and 9C. In an embodiment, the holes 101e are arranged in a matrix, as shown in FIG. 1C. In an embodiment, each hole 101e has a diameter of about 1 mm to about 5 mm. In another embodiment, the diameter of each hole 101e is greater than 5 mm.

In an embodiment, the vertical plate 101b of the first bracket 101 comprises a waveguide 101f located behind the vertical plate 101b. The waveguide 101f has a cross-section that is substantially quadrant shaped, as illustrated in FIG. 1E. The waveguide 101f is in fluid communication with the holes 101e defined through the vertical plate 101b. The holes 101e open into one of the linear sides 101u of the waveguide 101f. The other linear side 101w of the waveguide 101f provides an exit for sound that enters the waveguide 101f through the holes 101e. As illustrated in FIGS. 1A-1D, the waveguide 101f is hollow and extends along the length of the vertical plate 101b, from the second longitudinal edge 101q to the upper edge 101j of the vertical plate 101b. Sound emitting from the speaker 901 of an electronic device 900 passes through the holes 101e into the waveguide 101f. A curved side 101v of the waveguide 101f reflects the sound towards the other linear side 101w of the waveguide 101f, and the sound exits the waveguide 101f through the other linear side 101w. In an embodiment, the waveguide 101f is generally in the shape of a quarter cylinder which can be inferred from FIGS. 1B and 1E The horizontal plates 101t and 102t, the first retaining abutments 101a and 102a, and the back plates 101d and 102d of the first and second brackets 101 and 102 provide an enclosed structure with one side open to the adjustable mounting apparatus 100. Furthermore, the first retaining abutment 101a and the second retaining abutment 101x of the first bracket 101 define a L-shaped retaining abutment, as illustrated by the dotted lines in FIG. 1D. Similarly, the first retaining abutment 102a and the second retaining abutment 102x of the second bracket 102 define a horizontal flipped L-shaped retaining abutment, as illustrated by the dotted lines in FIG. 1D. The L-shaped retaining abutment of the first bracket 101, the horizontal flipped L-shaped retaining abutment of the second bracket 102 preclude the electronic device 900 from sliding forward and out of the adjustable mounting apparatus 100. The vertical plates 101b and 102b of the first and second brackets 101 and 102 preclude the electronic device 900 from sliding sideways in the adjustable mounting apparatus 100.

As illustrated in FIGS. 1A, 1C and 1D, the lower surfaces 101i and 102i of the back plates 101d and 102d are inclined with respect to the horizontal plates 101t and 102t of the first and second brackets 101 and 102. The inclined front, lower surfaces 101i and 102i of the back plates 101d and 102d are configured to position an electronic device 900 placed in the adjustable mounting apparatus 100, at an angle that is convenient for a user to view the electronic device 900. In an embodiment, the angle at which the electronic device 900 reclines is between 90 degrees to 120 degrees with respect to a horizontal plane.

In an embodiment, a single first bracket 101, or a single second bracket 102 is used to hold an electronic device 900 in an inclined position. The adjustable mounting apparatus 100, the first bracket 101, or the second bracket 102 is used to hold a flat object other than a portable handheld electronic device 900. Examples of flat objects comprise a photo frame, a notebook, etc.

Figure 2:
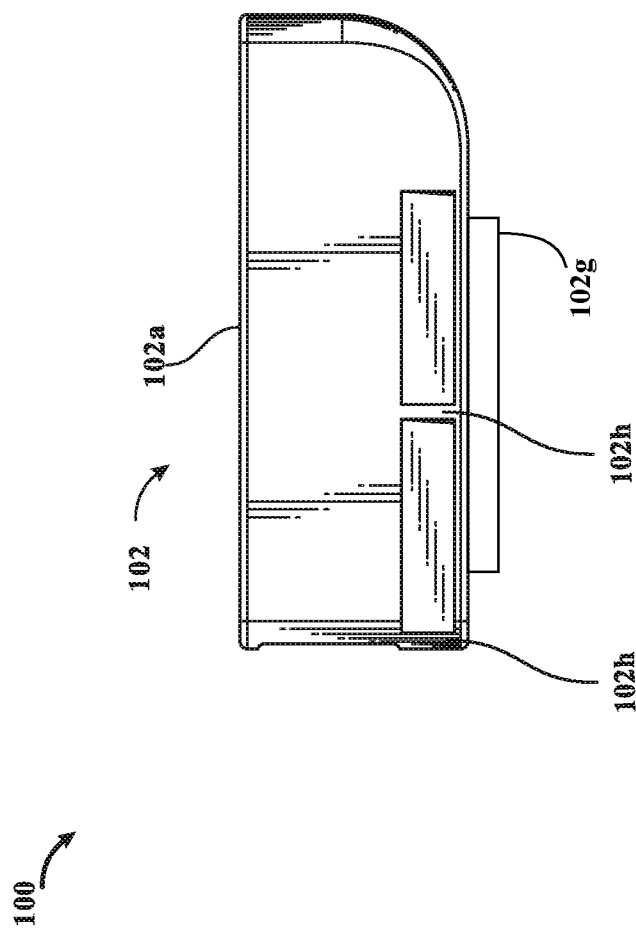
FIG. 2 exemplarily illustrates a bottom view of the adjustable mounting apparatus.
Figure 2:
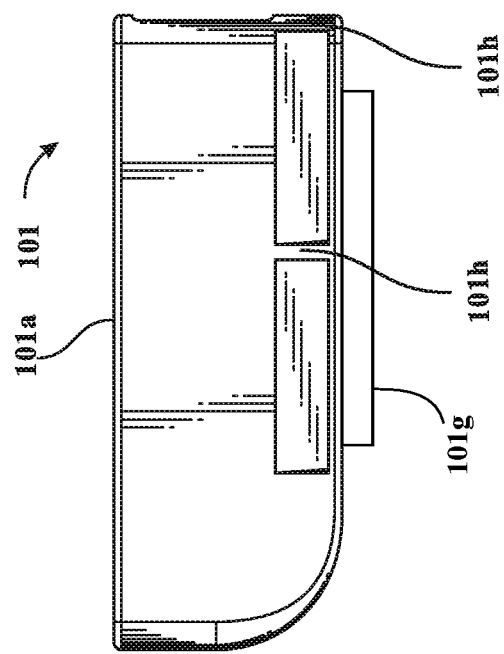

FIG. 2 exemplarily illustrates a bottom view of the adjustable mounting apparatus 100, showing the bottom of the first and second brackets 101 and 102. In an embodiment, the first and second brackets 101 and 102 comprise reinforcement members 101$h$ and 102$h$, as illustrated in FIG. 2. The reinforcement members 101$h$ and 102$h$ are disposed behind the lower surfaces 101$i$ and 102$i$ of the back plates 101$d$ and 102$d$ of the first and second brackets 101 and 102.

FIG. 3 exemplarily illustrates a rear view of the adjustable mounting apparatus 100 showing the reusable adhesive layers 101$g$ and 102$g$, attached to rear portions 101$z$ and 102$z$ of the back plates 101$d$ and 102$d$ of the first and second brackets 101 and 102. As illustrated in FIGS. 1A-1D and 3, the back plates 101$d$ and 102$d$ are not provided with a screw hole or a mounting hole. The first and second brackets 101 and 102 further comprise adhesive liners 301 and 302 for each of the reusable adhesive layers 101$g$ and 102$g$, as shown in FIG. 3. The adhesive liners 301 and 302 are applied over the reusable adhesive layers 101$g$ and 102$g$ when the first and second brackets 101 and 102 are not in use. In an embodiment, the adhesive liners 301 and 302 are release liners made of paper or a plastic-based film. In another embodiment, the adhesive liners 301 and 302 are made of plastic configured to be detachably attached to the reusable adhesive layers 101$g$ and 102$g$.

Figure 4:
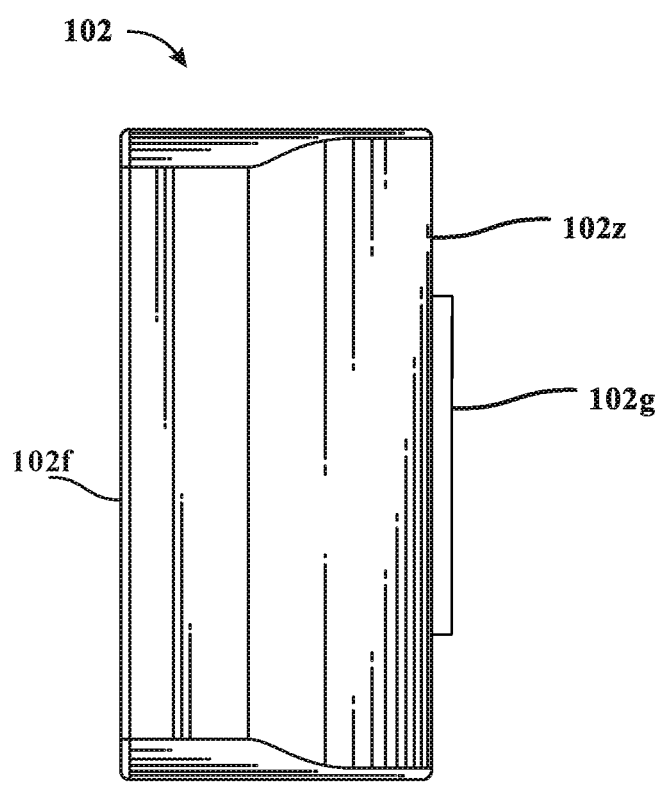
FIG. 4 exemplarily illustrates a right side view of the adjustable mounting apparatus.

FIG. 4 exemplarily illustrates a right side view of the adjustable mounting apparatus 100 showing the waveguide 102$f$ of the second bracket 102.

Figure 5:
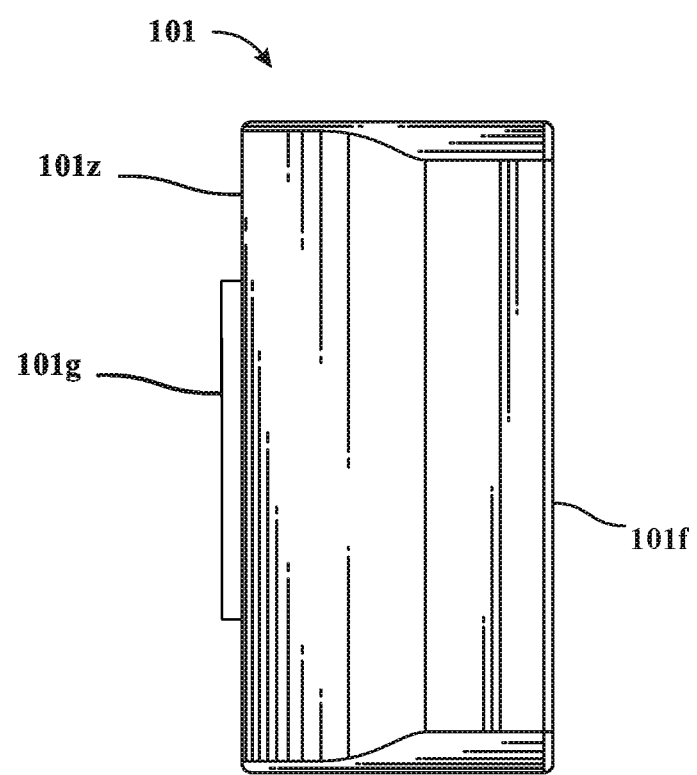
FIG. 5 exemplarily illustrates a left side view of the adjustable mounting apparatus.

FIG. 5 exemplarily illustrates a left side view of the adjustable mounting apparatus 100 showing the waveguide 101$f$ of the first bracket 101.

Figure 6B:
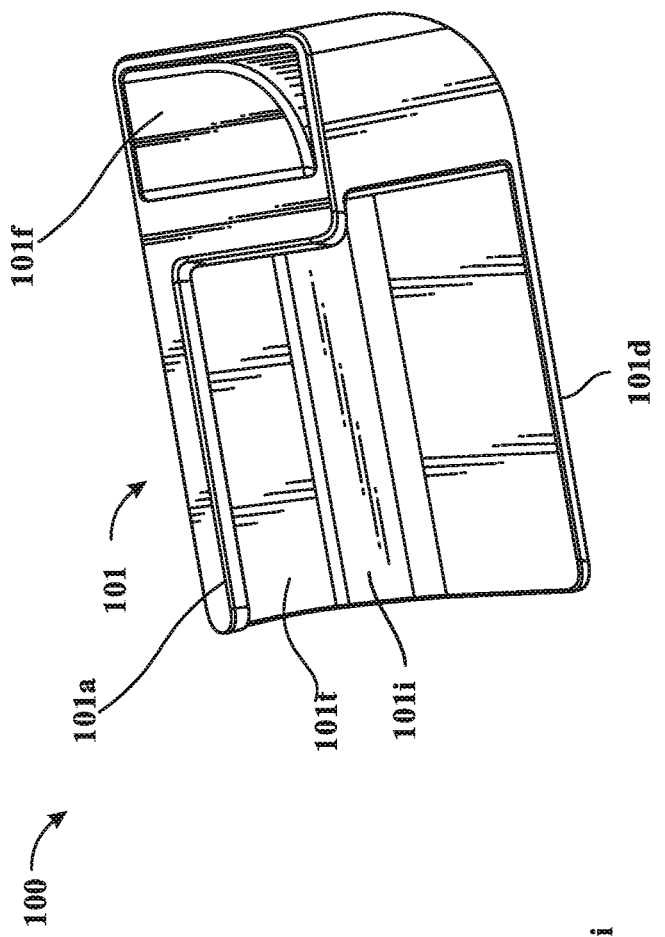
FIG. 6B exemplarily illustrates a top perspective view of the adjustable mounting apparatus.
Figure 6B:
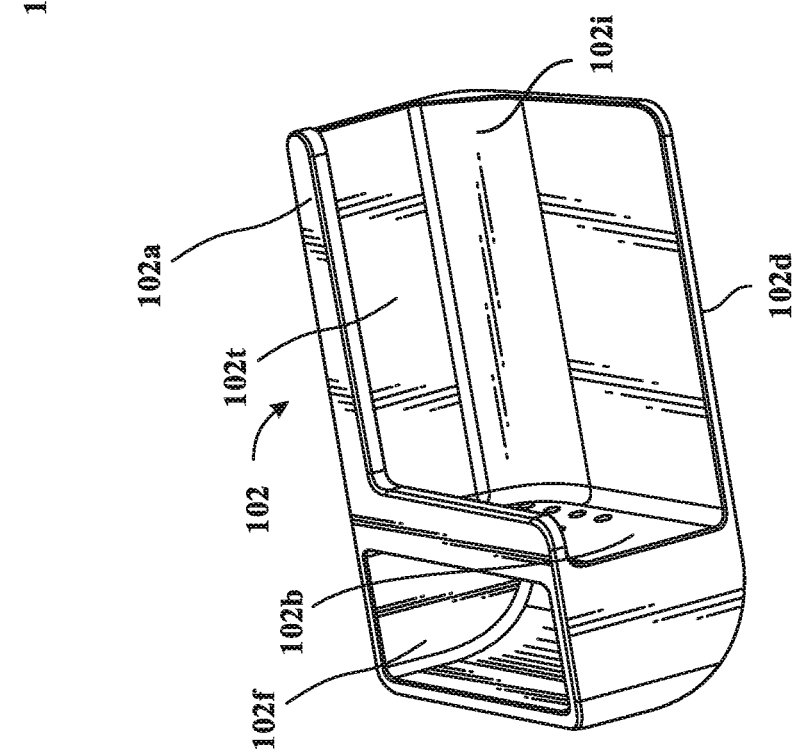

FIG. 6A exemplarily illustrates a top view of the adjustable mounting apparatus 100. FIG. 6B exemplarily illustrates a top perspective view of the adjustable mounting apparatus 100.

Figure 7:
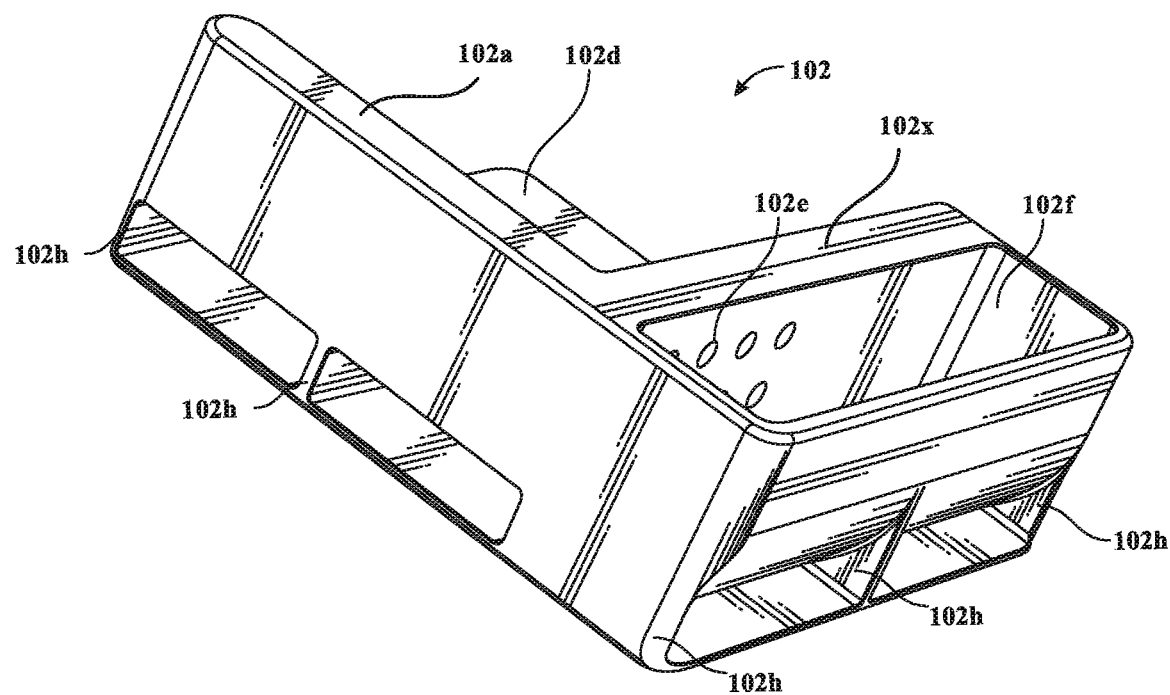
FIG. 7 exemplarily illustrates a bottom perspective view of a bracket of the adjustable mounting apparatus.

FIG. 7 exemplarily illustrates a bottom perspective view of the second bracket 102 showing reinforcement members 102$h$ that provide structural strength to the second bracket 102. The first bracket 101 also comprises reinforcement members 101$h$ as shown in FIGS. 2 and 8B. The first and second brackets 101 and 102 of the adjustable mounting apparatus 100 are made of one of metal, plastic, wood, recycled material, cardboard, etc. The first and second brackets 101 and 102 of the adjustable mounting apparatus 100 are configured to structurally support the weight of handheld portable electronic devices 900 weighing about 100 grams to about 4 kilograms. In an embodiment, each of the first and second brackets 101 and 102 of the adjustable mounting apparatus 100 are about 53 mm wide and about 50 mm high. In an embodiment, thickness of the first bracket 101 between the first retaining abutment 101$a$ and the back plate 101$d$ is about 21 mm. The second bracket 102 also has the same thickness between the first retaining abutment 102$a$ and the back plate 102$d$. In an embodiment, thickness of the material of the first and second brackets 101 and 102 is about 1 mm to about 2 mm.

Figure 8A:
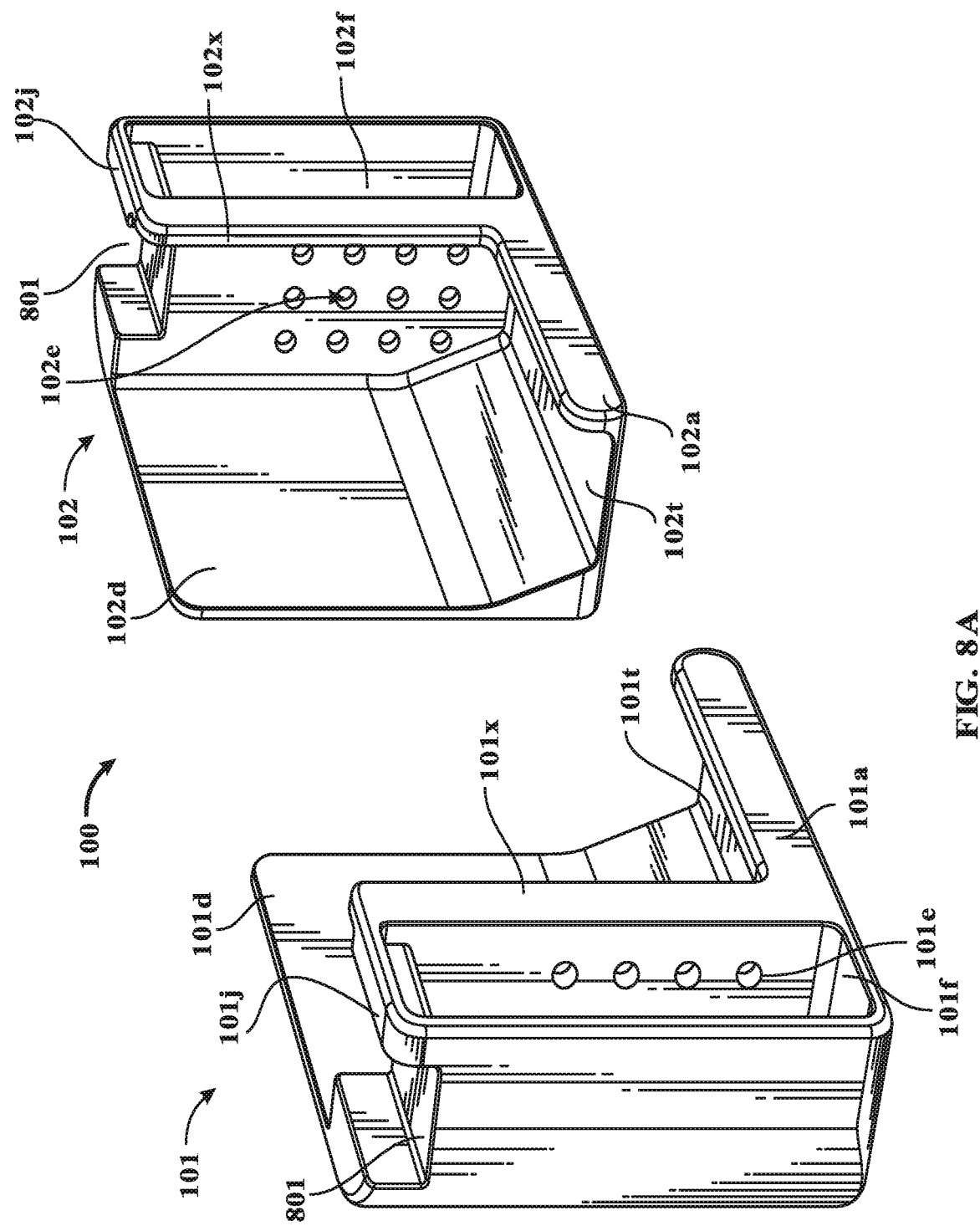
FIG. 8A exemplarily illustrates a front perspective view of an alternative embodiment of the adjustable mounting apparatus comprising a channel in each of the brackets for accommodating a connector of a charging cable.
Figure 8B:
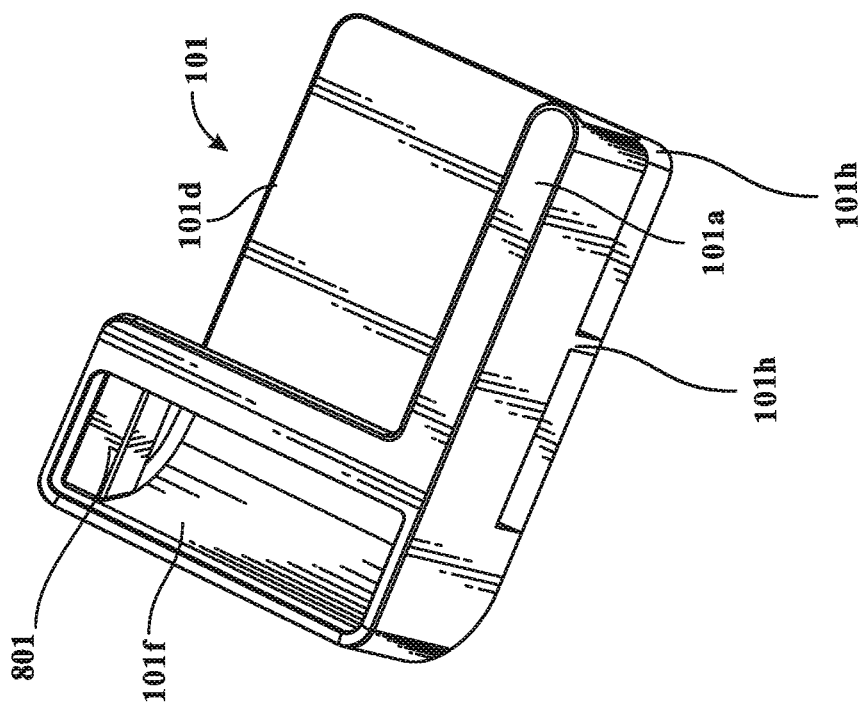
FIG. 8B exemplarily illustrates a bottom perspective view of the adjustable mounting apparatus illustrated in FIG. 8A.
Figure 8B:
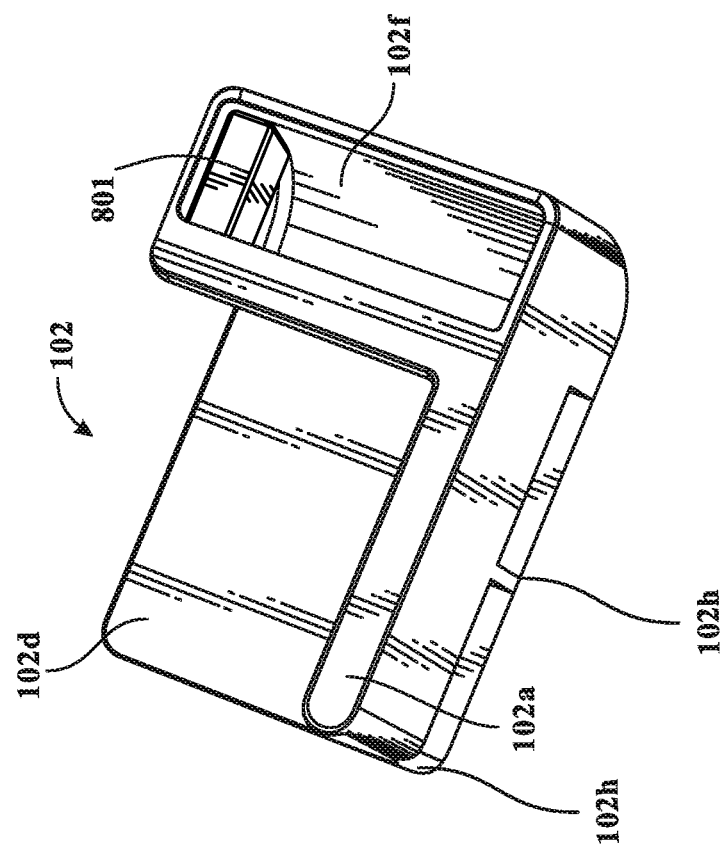
Figure 8C:
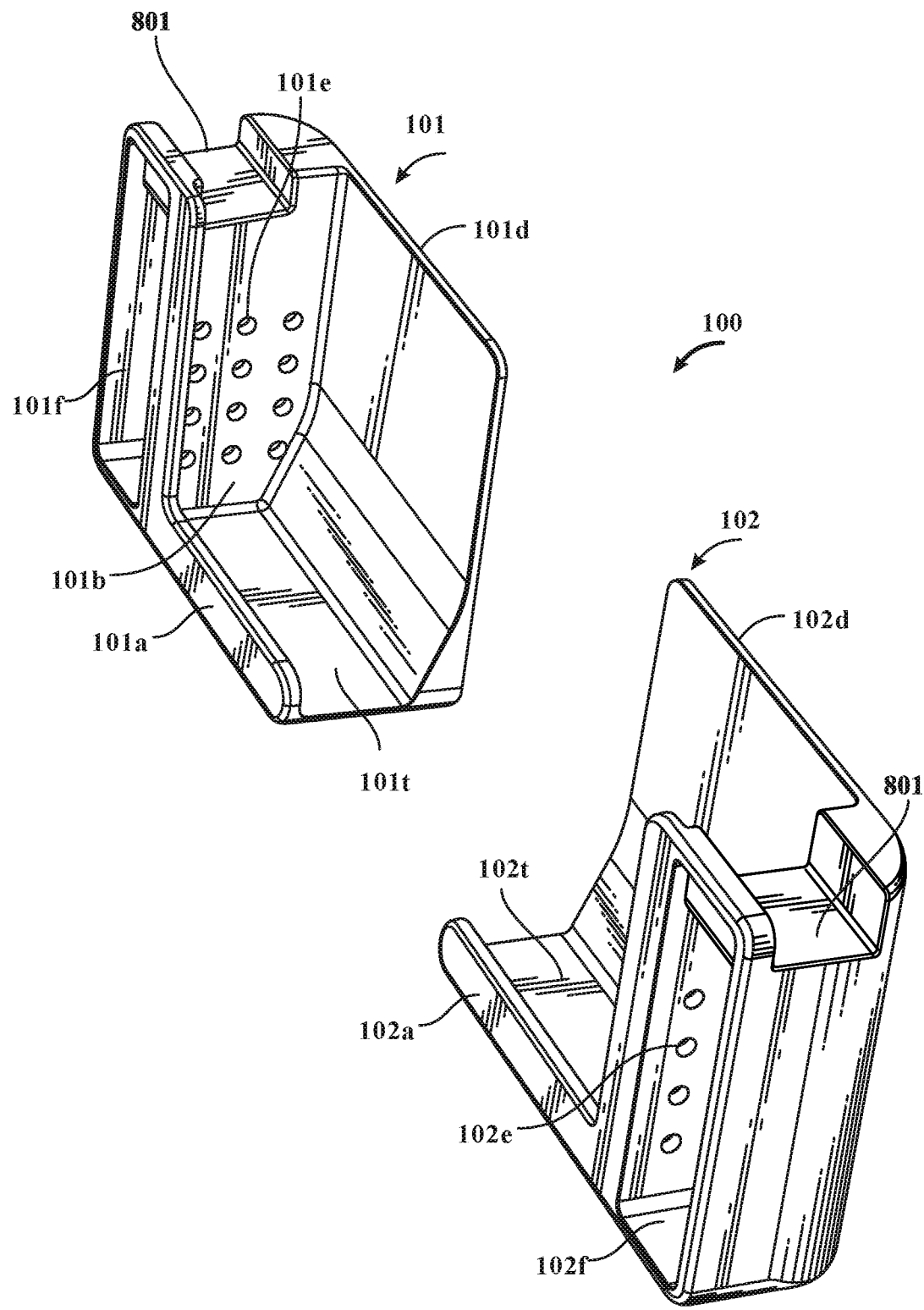
FIG. 8C exemplarily illustrates a front right side perspective view of the adjustable mounting apparatus illustrated in FIG. 8A.

FIG. 8A exemplarily illustrates a front perspective view of an embodiment of the adjustable mounting apparatus 100 comprising a channel 801 in each of the first and second brackets 101 and 102 for accommodating a connector of a charging cable. The channel 801 is cut into the waveguides 101$f$ and 102$f$ at the upper edges 101$j$ and 102$j$ of the vertical plates 101$b$ and 102$b$ of the first and second brackets 101 and 102. The channel 801 in each of the first and second brackets 101 and 102 is in communication with the vertical plates 101$b$ and 102$b$ of the first and second brackets 101 and 102. The channel 801 is perpendicular to the vertical plates 101$b$ and 102$b$ of the first and second brackets 101 and 102. FIG. 8B exemplarily illustrates a bottom perspective view of the adjustable mounting apparatus 100 illustrated in FIG. 8A. FIG. 8C exemplarily illustrates a front right side perspective view of the adjustable mounting apparatus 100 illustrated in FIG. 8A.

FIG. 9A exemplarily illustrates a front view of the adjustable mounting apparatus 100 illustrated in FIGS. 1A-7 with a portable electronic device 900 disposed in the adjustable mounting apparatus 100. FIG. 9B exemplarily illustrates a left side view of the portable electronic device 900 mounted on the adjustable mounting apparatus 100 illustrated in FIGS. 1A-7. FIG. 9C exemplarily illustrates a front, left side perspective view of the portable electronic device 900 mounted on the adjustable mounting apparatus 100 illustrated in FIGS. 1A-7. As illustrated in FIGS. 9A-9C, the adjustable mounting apparatus 100 comprises a first bracket 101 and a second bracket 102 that slidably engage with a handheld portable electronic device 900 or other objects for holding the handheld portable electronic device 900 or other objects. The first bracket 101 comprises a substantially horizontal plate 101$t$, a back plate 101$d$ extending substantially vertically from a second transverse edge 101$n$ of the horizontal plate 101$t$, wherein a lower surface 101$i$ of the back plate 101$d$ is inclined with respect to the substantially horizontal plate 101$t$, a substantially vertical plate 101$b$ extending from a second longitudinal edge 101$q$ of the horizontal plate 101$t$, and a second retaining abutment 101$x$ extending substantially laterally from a first transverse edge 101$y$ of the vertical plate 101$b$. The vertical plate 101$b$ comprises a waveguide 101$f$ located behind the vertical plate 101$b$. The second bracket 102 comprises a substantially horizontal plate 102$t$, a back plate 102$d$ extending substantially vertically from a second transverse edge 102$n$ of the horizontal plate 102$t$, wherein a lower surface 102$i$ of the back plate 102$d$ is inclined with respect to the substantially horizontal plate 102$t$, a substantially vertical plate 102$b$ extending from a second longitudinal edge 102$q$ of the horizontal plate 102$t$, and a second retaining abutment 102$x$ extending substantially laterally from a first transverse edge 102$y$ of the vertical plate 102$b$. The vertical plate 102$b$ comprises a waveguide 102$f$ located behind the vertical plate 102$b$.

Figure 9D:
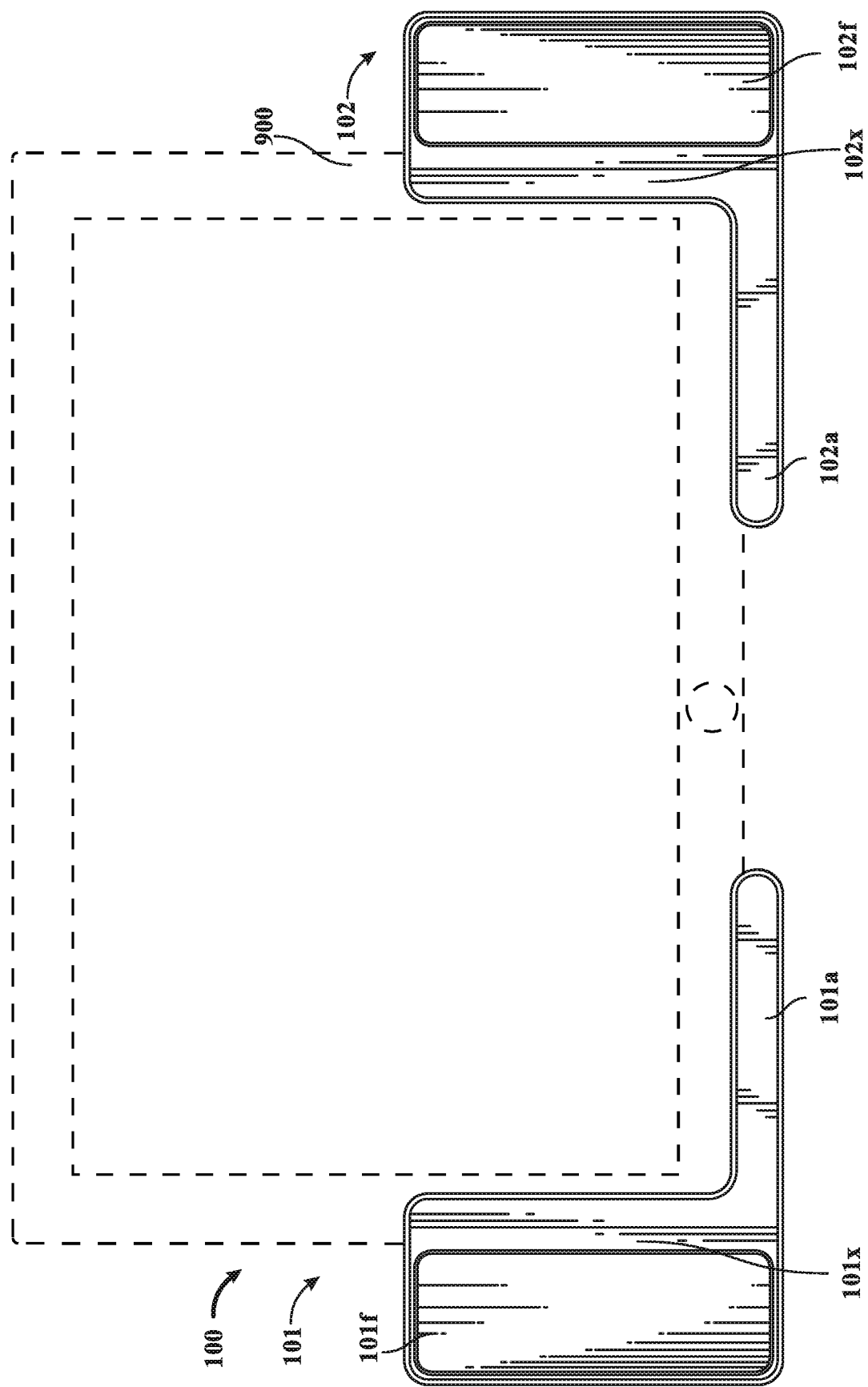
FIG. 9D exemplarily illustrates a front view of the adjustable mounting apparatus illustrated in FIGS. 1A-7 with a portable electronic device disposed within the adjustable mounting apparatus.

FIG. 9D exemplarily illustrates a front view of the adjustable mounting apparatus 100 illustrated in FIGS. 1A-7 with a portable electronic device 900 disposed within the adjustable mounting apparatus. The adjustable mounting apparatus 100 is designed to provide a convenient, hands free experience for portable electronic device 900 usage to a user. The portable electronic device 900 is, for example, a mobile device 900. To use the adjustable mounting apparatus 100, the user mounts the mobile device 900 on the horizontal plates 101$t$ and 102$t$ of the first and second brackets 101 and 102. The first and second brackets 101 and 102 are then pressed against a flat surface 902 where the portable electronic device 900 is to be secured. The reusable adhesive layers 101$g$ and 102$g$ at the rear portions 101$z$ and 102$z$ of the back plates 101$d$ and 102$d$, securely mount the first and second brackets 101 and 102, and the mobile device 900 to the flat surface 902. The user may watch videos, takes photos, etc., using the mobile device 900 while the mobile device 900 is securely mounted to the flat surface 902 through the first and second brackets 101 and 102 of the adjustable mounting apparatus 100. When the portable electronic device 900 is to be removed from the adjustable mounting apparatus 100, the user unmounts the mobile device 900 from the horizontal plates 101t and 102t of the first and second brackets 101 and 102. The user then slowly twists each of the first and second brackets 101 and 102, and pulls the first and second brackets 101 and 102 off the flat surface 902. The user then reapplies the adhesive liners 301 and 302 to the reusable adhesive layers 101g and 102g at the rear portions 101z and 102z of the back plates 101d and 102d of the first and second brackets 101 and 102. The user then places the first and second brackets 101 and 102 of the adjustable mounting apparatus 100 in a storage case (not shown) to protect the adjustable mounting apparatus 100 while traveling or until future use. If the reusable adhesive layers 101g and 102g loses its adhesive property, the user can wash and lightly scrub the reusable adhesive layers 101g and 102g, and allow the reusable adhesive layers 101g and 102g to dry in the ambient environment to restore the adhesive property.

The foregoing examples have been provided merely for explanation and are in no way to be construed as limiting of the adjustable mounting apparatus 100 disclosed herein. While the adjustable mounting apparatus 100 has been described with reference to various embodiments, it is understood that the words, which have been used herein, are words of description and illustration, rather than words of limitation. Furthermore, although the symbolic adjustable mounting apparatus 100 has been described herein with reference to particular means, materials, and embodiments, the adjustable mounting apparatus 100 is not intended to be limited to the particulars disclosed herein; rather, the adjustable mounting apparatus 100 extends to all functionally equivalent structures, methods and uses, such as are within the scope of the appended claims. While multiple embodiments are disclosed, it will be understood by those skilled in the art, having the benefit of the teachings of this specification, that the adjustable mounting apparatus 100 disclosed herein is capable of modifications and other embodiments may be effected and changes may be made thereto, without departing from the scope and spirit of the adjustable mounting apparatus 100 disclosed herein.

We claim:

1. An adjustable mounting apparatus, comprising:
    a first bracket and a second bracket; and
    the first bracket and the second bracket each comprising:
        a substantially horizontal plate, wherein the substantially horizontal plate comprises a first retaining abutment extending substantially vertically from a first transverse edge of the substantially horizontal plate;
        a back plate extending substantially vertically from a second transverse edge of the substantially horizontal plate;
        a substantially vertical plate extending from a second longitudinal edge of the horizontal plate, wherein the substantially vertical plate comprises a second retaining abutment extending substantially laterally from a first transverse edge of the substantially vertical plate; and
        a reusable adhesive layer disposed at a rear portion of the back plate.

2. The adjustable mounting apparatus of claim 1, wherein each of the first and second brackets further comprises a plurality of holes defined through the substantially vertical plate.

3. The adjustable mounting apparatus of claim 2, wherein the plurality of holes are proximal to the second longitudinal edge of the substantially horizontal plate.

4. The adjustable mounting apparatus of claim 2, wherein each of the first and second brackets further comprise a waveguide disposed below the substantially vertical plate, and wherein the waveguide is in fluid communication with the holes.

5. The adjustable mounting apparatus of claim 4, wherein the waveguide extends along a length of the substantially vertical plate.

6. The adjustable mounting apparatus of claim 4 further comprises a channel cut into the waveguide in an upper edge of the substantially vertical plate, wherein the channel is perpendicular to the substantially vertical plate, wherein the channel is in communication with the substantially vertical plate, and wherein the channel is configured to accommodate one or more of a charging connector and an audio connector.

7. The adjustable mounting apparatus of claim 1, wherein the reusable adhesive layer is washable.

8. The adjustable mounting apparatus of claim 1, wherein the first retaining abutment and the second retaining abutment define a L-shaped retaining abutment, and wherein the second retaining abutment is substantially perpendicular to the substantially vertical plate.

9. The adjustable mounting apparatus of claim 1, wherein the first retaining abutment and the second retaining abutment define a horizontally flipped L-shaped retaining abutment, and wherein the second retaining abutment is substantially perpendicular to the substantially vertical plate.

10. The adjustable mounting apparatus of claim 1, wherein the back plate has a substantially rectangular shape, wherein a lower surface of the back plate is inclined with respect to the substantially horizontal plate.

11. A bracket, comprising:
    a substantially horizontal plate, wherein the substantially horizontal plate comprises a first retaining abutment extending substantially vertically from a first transverse edge of the substantially horizontal plate;
    a back plate extending substantially vertically from a second transverse edge of the substantially horizontal plate;
    a substantially vertical plate extending from a second longitudinal edge of the substantially horizontal plate, wherein the substantially vertical plate comprises a second retaining abutment extending substantially laterally from a first transverse edge of the substantially vertical plate; and
    a reusable adhesive layer located at a rear portion of the back plate.

12. The bracket of claim 11 wherein the bracket further comprises a plurality of holes defined through the substantially vertical plate.

13. The bracket of claim 12, wherein the plurality of holes are proximal to the second longitudinal edge of the substantially horizontal plate.

14. The bracket of claim 12, wherein each of the first and second brackets further comprise a waveguide disposed below the substantially vertical plate, and wherein the waveguide is in fluid communication with the holes.

15. The bracket of claim 14, wherein the waveguide extends along a length of the substantially vertical plate.

16. The bracket of claim 14 further comprises a channel cut into the waveguide in an upper edge of the substantially vertical plate, wherein the channel is substantially perpendicular to the substantially vertical plate, wherein the channel is in communication with the substantially vertical plate, and wherein the channel is configured to accommodate one or more of a charging connector and an audio connector.

17. The bracket of claim 11, wherein the adhesive layer is washable and reusable.

18. The bracket of claim 11, wherein the first retaining abutment and the second retaining abutment define a L-shaped retaining abutment, and wherein the second retaining abutment is substantially perpendicular to the substantially vertical plate.

19. The bracket of claim 11, wherein the first retaining abutment and the second retaining abutment define a horizontally flipped L-shaped retaining abutment, and wherein the second retaining abutment is substantially perpendicular to the substantially vertical plate.

20. The bracket of claim 11, wherein the back plate has a substantially rectangular shape, and wherein a lower surface of the back plate is inclined with respect to the substantially horizontal plate.

\* \* \* \* \*